US006346347B1

(12) United States Patent
McNally et al.

(10) Patent No.: US 6,346,347 B1
(45) Date of Patent: Feb. 12, 2002

(54) ORGANIC EXPANDER FOR LEAD-ACID STORAGE BATTERIES

(75) Inventors: Timothy J. McNally, Mosinee; Michael E. Sanford, Wausau, both of WI (US); Bernt O. Myrvold, Sarpsborg (NO); Detchko Pavlov Detchkov, Sofia (BG); Temelaki Vasilev Rogachev, Sofia (BG); Geno Petkov Papazov, Sofia (BG); Maria Borisova Matrakova, Sofia (BG)

(73) Assignee: Lignotech, U.S.A., Inc., Rothschild, WI (US)

( * ) Notice: Subject to any disclaimer, the term of this patent is extended or adjusted under 35 U.S.C. 154(b) by 0 days.

(21) Appl. No.: 09/400,671

(22) Filed: Sep. 21, 1999

(51) Int. Cl.$^7$ ............................ H01M 4/62; C08L 97/00
(52) U.S. Cl. ........................ 429/215; 29/623.5; 530/501
(58) Field of Search .......................... 29/623.1, 623.5; 429/212, 215, 225, 228; 530/500, 501

(56) References Cited

U.S. PATENT DOCUMENTS

| 2,371,136 A | 3/1945 | Harmon ..................... 260/124 |
| 2,371,137 A | 3/1945 | Orsino et al. ................. 136/26 |
| 4,293,459 A | 10/1981 | Detroit ..................... 260/17.5 |
| 4,323,470 A | * 4/1982 | Mahato et al. |

FOREIGN PATENT DOCUMENTS

| DE | 3828374 A1 | 2/1990 |
| EP | 0809311 A1 | 11/1997 |
| GB | 1602383 | 11/1981 |

OTHER PUBLICATIONS

Hehner, "Storage Battery Manufacturing Manual," Third Edition, pp. 16–24, 1986. (No Month Available).
Vinal, "Storage Batteries—A General Treatise on the Physics and Chemistry of Secondary Batteries and their Engineering Applications," Fourth Edition, pp. 20–35, 1955. (No Month Available).
Kirk–Othmer, "Encyclopedia of Chemical Technology—Antibiotics (No Month) (Phenazines) to Bleaching Agents," Third Edition, vol. 3, p. 655, 1978.
Kirk–Othmer, "Encyclopedia of Chemical Technology—Laminated Wood–Based Composites to Mass Transfer," Third Edition, vol. 14, pp. 304–308, 1981. (No Month).
Sarkanen and Ludwig, "Lignins—Occurrence, Formation, Structure and Reactions," pp. 838–839, 1971. (No Month).
Abstract of Chinese Patent No. CN1104376, "Negative–pole Active Material for Fully–Sealed Maintenance–Free Accumulator," Registered Jun. 28, 1995.
Abstract of Japanese Patent Publication No. 55133769, "Native Plate for Lead–Acid Storage Battery," Published Oct. 17, 1980.
Abstract of Japanese Patent Publication No. 07211319, "Lead–Acid Battery," Published Aug. 11, 1995.
Abstract of Japanese Patent Publication No. 09082317, "Anodes for Lead–Acid Batteries with Long Cycle Life," Published Mar. 28, 1997.
Abstract of Japanese Patent Publication No. 09147872, "Anodes for Lead–Acid Secondary Batteries," Registered Jun. 6, 1997.
Abstract of Japanese Patent Publication No. 09147873, "Negative Electrode Plate for Lead–Acid Battery," Published Jun. 6, 1997.
Pub. No. 09213336, Patent Abstracts of Japan vol. 1997, No. 12, Aug. 15, 1997.

* cited by examiner

*Primary Examiner*—Carol Chaney
*Assistant Examiner*—Susy Tsang
(74) *Attorney, Agent, or Firm*—Andrus Sceales Starke & Sawall LLP

(57) ABSTRACT

An organic expander composition for improving the cycle life and the cold crank ability properties of lead-acid batteries as compared to standard or oxylignin organic expanders. The organic expander composition is obtained by a blend of oxylignin and kraft lignin.

35 Claims, No Drawings

ORGANIC EXPANDER FOR LEAD-ACID STORAGE BATTERIES

BACKGROUND OF THE INVENTION

1. Field of the Invention

The present invention relates to storage batteries of the lead-acid type, and has particular application to a new type of organic expander composition which is incorporated into the oxide or paste used in making the negative plates of such storage batteries. The composition of the invention improves a storage battery by greatly increasing its capacity and life, particularly cycle life and cold cranking capacity at high rates of discharge and at low temperatures.

2. Description of the Related Art

As used herein, the term "oxylignin" is defined as a chemical compound consisting principally of lignin derivatives in an oxidized state. Commercial examples are available under the tradenames Vanisperse A, an oxylignin produced by Borregaard LignoTech in Sarpsborg, Norway, Maracell XC-2 an oxylignin produced by LignoTech USA, Inc. (a member of the Borregaard Group) in Rothschild, Wis., and Vanillex, an oxylignin produced by DP & Chemical Division of Nippon Paper Industries Co., Ltd., Tokyo Japan. These oxylignins are characterized as acid-insoluble and alkaline-dispersible lignin sulfonic acid compounds substantially free of calcium and manganese compounds as well as non-ligneous organic and inorganic impurities. These products are produced by treatment of softwood sulfite liquor under alkaline conditions at high temperature and high pressure. The treatment comprises a material reduction in the organically combined sulfur content, as well as condensation, cleavage and rearrangement reactions due to oxidation and hydrolysis. The reactions increase the number of phenolic and hydroxyl groups in the molecular structure. An example of a process for making these oxylignin compounds is described in U.S. Pat. No. 2,371,136 by Carlyle Harmon of Marathon Corporation, a predecessor of LignoTech USA, Inc. In the present art, the material described in U.S. Pat. No. 2,371,136 is referred to as an "oxylignin". The oxylignin, Vanisperse A, is the most widely used organic expander in storage batteries of the lead-acid type for starting, lighting and ignition (SLI) applications. Hence, Vanisperse A is the industry standard for organic expanders.

The term "kraft" lignin refers to lignin products derived from the alkaline pulping process by lowering the pH of the lignin solution. Then, by means of thorough washing a very pure lignin is obtained. Kraft lignin is also called sulfate or alkali lignin. In U.S. Pat. No. 4,293,459, it is stated that alkali or kraft lignins are generally prepared by cooking woodchips with a 10% solution of a mixture of sodium hydroxide with about 20 mole percent of sodium sulfide resulting in a sodium modified compound which is very soluble in the strongly alkaline solutions. The alkali lignins are removed from solution by lowering the pH to the acid side whereby the alkali lignins precipitate. These precipitated unsulfonated, alkali lignins may be utilized to prepare sulfonated derivatives, typically by treating them with a solution of alkali sulfite or alkali sulfite and alkylaldehyde at elevated temperature and pressure. Although a very complex macromolecule, a generally accepted descriptive structure and preparation of kraft lignin is discussed in Kirk-Othmer, Encyclopedia of Chemical Technology, $3^{rd}$ ed., vol. 14, pages 304–308. Also, the isolation and properties of kraft lignin are described in K. V. Sarkanen and C. H. Ludwig, Lignins, pages 838–840. Examples of commercial kraft lignin are available under the tradenames Curan manufactured by LignoTech Sweden AB (a member of the Borregaard Group) in Vargon, Sweden and Indulin manufactured by Westvaco in Charleston Heights, S. C. Kraft lignin can also be chemically modified in different ways, e.g. sulfonation, methylation, carboxylation and fractionation.

Many organic materials have been used in the prior art to improve the cycle life and low temperature capacity of storage batteries of the lead-acid type. These materials have included wood flour, lignins, ligneous materials, humins, humic acids, organic material from sulfite and sulfate liquors, and the like. These materials have been known to the trade as organic expanders because of their supposed action of expanding or increasing the sponge-like nature of the negative active material.

U.S. Pat. No. 2,371,136 describes the improvements oxylignins impart to storage batteries of the lead-acid type over the organic expanders mentioned in the above paragraph. More specifically, oxylignin type materials do not produce objectionable foaming of the electrolyte during formation of the battery, nor does the use of oxylignin result in sulfation characteristic of the negative plates during such electrical formation. Further the use of oxylignins was shown to improve the cold crank ability of the storage battery over the then prior art. The effects and advantages of the use of expanders in producing negative battery plates is discussed in Kirk-Othmer, Encyclopedia of Chemical Technology, $3^{rd}$ ed., vol. 3, page 655.

SUMMARY OF THE INVENTION

In the present invention, it has been found that both the cycle life and the cold crank ability of a storage battery of the lead-acid type can be improved beyond using the oxylignin or kraft lignin alone by incorporation of a mixture (or reaction products) of both the oxylignin and the kraft lignin. In effect there appears to be a synergy between the two materials. When used together in an appropriate blend the result is improved cycle life and cold crank ability performance beyond either when used alone.

Accordingly, the present invention provides an organic expander composition for use in a negative plate of a lead-acid storage battery. The composition comprises a blend of an oxylignin and a kraft lignin wherein the blend contains from about 1 part oxylignin and about 2 parts kraft lignin to about 2 parts oxylignin and about 1 part kraft lignin. The oxylignin may optionally be a modified oxylignin composed of a condensation reaction product between oxylignins and/or between an oxyliginin and a kraft lignin. Likewise, the kraft lignin may optionally be a modified kraft lignin composed of a condensation reaction product between kraft lignins and/or between an oxylignin and a kraft lignin.

DETAILED DESCRIPTION OF THE PREFERRED EMBODIMENT

According to the present invention, it has been found that if a mixture containing an oxylignin and a kraft lignin is added to the negative oxide or negative paste used to prepare negative plates of storage batteries, the resultant batteries show vastly improved capacity and life characteristics. The mixture can range from about 1 part oxylignin and about 2 parts kraft lignin to about 2 parts oxylignin and about 1 part kraft lignin.

It has been found that the amount of the blend of oxylignin and kraft lignin needed to produce the beneficial effects of the present invention is on the order of 0.1% to 0.4%, preferably 0.2%, of the weight of the lead compound used in the negative plates of the battery.

Thus it has been observed that if the negative plates of nominal 45 ampere hour storage batteries are made with leady oxide containing 0.1% to 0.4%, preferably 0.2%, of the active material described below, together with the usual blanc fixe and carbon black additions, and tested according to the German test procedure DIN43539-1 standard then the resultant battery delivers cycle life and cold crank ability performance dramatically improved over prior art as represented by the oxylignin Vanisperse A or the kraft lignin, Curan.

For the purpose of demonstrating the invention, several batches of expanders were prepared in accordance with the disclosed composition. In the following, the solution pH of Compositions 1–4 prior to the condensation reaction with formaldehyde may range from 10 to 11.2 with a pH of 10.5 to 11 being preferred. Also, although solution pH is described as being adjusted with caustic soda, other pH adjusting agents could also be used. Hydroxides and carbonates of the alkali metals, such as sodium or potassium, are preferred.

Composition 1 (Organic Expander Preparation)

Into water Curan and Vanisperse A were added at the ratio of one part to two parts, respectively. The solution pH was adjusted to 10.5 with a 25% caustic soda solution. Next, 37% formaldehyde was added at the level of 1% formaldehyde on combined Curan and Vanisperse A solids. The mixture was heated to 70° C. for five hours and then spray dried.

Composition 2 (Organic Expander Preparation)

Into water Curan and Vanisperse A were added at the ratio of one part to one part, respectively. The solution pH was adjusted to 10.5 with a 25% caustic soda solution. Next, 37% formaldehyde was added at the level of 1% formaldehyde on combined Curan and Vanisperse A solids. The mixture was heated to 70° C. for five hours and then spray dried.

Composition 3 (Organic Expander Preparation)

Into water Curan and Vanisperse A were added at the ratio of two parts to one part, respectively. The solution pH was adjusted to 10.5 with a 25% caustic soda solution. Next, 37% formaldehyde was added at the level of 1% formaldehyde on combined Curan and Vanisperse A solids. The mixture was heated to 70° C. for five hours and then spray dried.

Composition 4 (Expander Preparation)

0.7 grams of Indulin AT were added to 0.3 grams of Vanisperse A without blending. To these powders the usual carbon black, 0.45 grams, and blanc fixe, 3.18 grams, were added.

Composition 5 (Expander Preparation)

0.7 grams of Curan were added to 0.3 grams of Vanisperse A without blending. To these powders the usual carbon black, 0.45 grams, and blanc fixe, 3.18 grams, were added.

Composition 6 (Expander Preparation)

1.0 gram of Vanisperse A was added to the usual carbon black, 0.45 grams, and blanc fixe, 3.18 grams.

Composition 7 (Expander Preparation)

1.0 gram of Curan was added to the usual carbon black, 0.45 grams, and blanc fixe, 3.18 grams.

Composition 8 (Expander Preparation)

1.0 gram of Indulin AT was added to the usual carbon black, 0.45 grams, and blanc fixe, 3.18 grams.

Investigation of Initial Battery Performance Tests

EXAMPLE 1

Using lead-acid cells composed of two positive plates and one negative plate is an accepted method to screen components critical to the negative plate. By design the performance of the cell is limited by the negative plate. This technique was employed and the negative plate and cell construction is described below.

For more information relating to storage battery manufacture one should refer to "Storage Battery Manufacturing Manual," $3^{rd}$ ed., by Nels Hehner and Joseph A. Orsino, 1986. Pages 16–17 describe lead oxides, and pages 18–24 describe preparing paste. Another good reference source is "Storage Batteries," $4^{th}$ ed., by G. W. Vinal. Pages 21–23 cover lead oxides, and pages 30–33 describe preparing paste. The above texts describe and define suitable materials and methods of preparing pastes for lead-acid storage batteries. Orsino teaches that the lead oxide used in the paste for the manufacture of lead-acid storage batteries is chemically composed of a mixture of lead oxide (PbO), litharge, and powdered pure lead (Pb). Orsino explains the normal commercial grades of lead oxide, sometimes called leady oxide, are within the range of 65%–83% PbO and 35%–17% Pb. Vinal teaches that lead monoxide (PbO), also called litharge, and red lead ($Pb_3O_4$), also called minium, can be used. Further, mixtures of the above can be used.

The negative plates were produced using commercial grids cast from Pb—1.8%Sb—0.1% As—0.2%Sn alloy. The pastes were prepared using a laboratory paste mixer. The following paste formulation was used: leady oxide (LO) with 73% degree of oxidation, 0.2 wt. % carbon black, 0.8 wt. % $BaSO_4$ (blanc fixe) and 0.2 wt % organic expander. $H_2SO_4$ solution (1.4 s.g.) was added to the mixture in a ratio $H_2SO_4$/LO equal to 4.5%, wt %. Water was added in an amount to yield a paste density of 4.1 g/cm3. The paste was mixed for 20 minutes at a temperature not exceeding 50° C.

The thus prepared paste was pasted onto the grids and the plates were set to curing at 45° C. for 48 hours. The cured plates were then subjected to formation. $H_2SO_4$ with s.g. 1.05 was used. The quantity of electricity that passed through the plates during formation was 1.8 of their theoretical capacity. All plates had equal weight and their rated capacity was 11 Ah at 54% utilization of the active material.

Cells were assembled with one negative and two positive plates. The capacity, $C_4$, was measured at 4-hour rate of discharge with a current of 2.7 A/plate at 25° C.+/−1° C. Table 1 summarizes the data from three capacity measurements and their mean values at 4-hour rate of discharge for batteries assembled with cells comprising one negative and two positive plates. The data indicate that the Compositions 1 through 3 are comparable and have initial capacity comparable to the industry standard organic expander Vanisperse A, an oxylignin, yet measurably less than Curan, a kraft lignin. The initial CCA data indicate that Compositions 1 and 2 are comparable to Vanisperse A, and Composition 3 CCA is measurably greater than Vanisperse A and equivalent to Curan. In summary, based on initial screening tests the three compositions relative to the control base organic expanders seem unremarkable and not altogether unexpectedly a compromise of the two base expanders.

Table 1. Results from three capacity measurements at 4-hour rate of discharge and two CCA tests (I=3.5C4 A, −18° C.) of 6 V/11 Ah batteries assembled with negative plates containing 0.2% expander.

| N | Expander In Paste | 1st Capacity, Ah | 2nd Capacity, Ah | 3rd Capacity, Ah | Mean Capacity, Ah | 1st CCA | 2nd CCA | Mean CCA |
|---|---|---|---|---|---|---|---|---|
| 1 | Vanisperse A | 11.61 | 11.50 | 11.65 | 11.59 | 166 | 166 | 166 |
| 2 | Composition 1 (1:2 Curan:Vanipserse A) | 11.60 | 11.40 | 11.45 | 11.48 | 166 | 186 | 176 |
| 3 | Composition 2 (1:1 Vanisperse A:Curan) | 11.50 | 11.31 | 11.37 | 11.39 | 167 | 116 | 141 |
| 4 | Composition 3 (2:1 Curan:Vanisperse A) | 11.50 | 11.42 | 11.51 | 11.48 | 199 | 201 | 200 |
| 5 | Curan | 12.13 | 12.38 | 12.63 | 12.38 | 190 | 212 | 201 |

EXAMPLE 2

It is known from practical experience that the strong beneficial effect of a given expander is not always preserved on cycling of the batteries. Therefore, it is necessary to cycle the batteries through repeated charge and discharge cycles and periodically measure critical performance criteria. With the above objective in mind, the German standard test procedure, identified as DIN43539-2, was employed to test batteries containing three dosages, 0.1%, 0.2% and 0.4% wt. on wt. of leady oxide, of the organic expanders Curan and Composition 3 and 0.1% and 0.2% of the organic expander Vanisperse A. DIN43539-2 is the testing procedure adopted throughout Europe, India and the Far East countries. Due to the cost and time involved, one Composition was selected as representative of the three.

Twelve volt/45 Ah storage batteries of the lead-acid type were prepared containing six cells, each with four negative plates in polyethylene separators and five positive plates. The electrolyte was 1.28 s. g. $H_2SO_4$. The batteries contained the organic expanders, Curan and Composition 3 at concentrations of 01%, 0.2% and 0.4% wt on weight leady-oxide and Vanisperse A at 0.1% and 0.2%. The other usual expander additives, carbon black and blanc fixe, were present at typical concentrations, 0.2% and 0.8%, respectively.

The DIN43539-2 test protocol is comprised of two sections and batteries are dedicated to each. Both sections specify critical performance properties the batteries must achieve in order to be considered suitable for use in commercial production. The first section specifies standards for initial and life cycle performance. The second section specifies standards for charge acceptance and self-discharge.

The initial performance tests are comprised of three reserve capacity (RC) tests and two cold crank ability (CCA) tests in the following alternating sequence (RC/CCA/RC/CCA/RC). The capacity test ($C_{20}$) was performed at the 20-hour rate of discharge at 25° C. and the cold crank ability test was performed at a rate five times the 20-hour rate of discharge (Current $I=5C_{20}$) at −18° C. To summarize the data from the initial performance tests (data not included), Composition 3 met or exceeded all specified test standards for capacity and cold crank ability at the three dosages tested, 0.1%, 0.2% and 0.4%. The base organic expanders, Curan and Vanisperse A, met or exceeded specified initial test standards at 0.2%. Hence the results for the three expanders at 0.2% are consistent with the above tests mentioned in EXAMPLE 1 and Composition 3 was, relative to the base organic expanders, again unremarkable. The Curan and Vanisperse A, at the 0.1% dosage, failed at least one test standard and, according to this test, consequently would not be considered suitable for use in commercial batteries at 0.1% dosage. Curan at the 0.4% concentration met or exceeded all specified test standards for capacity and cold crank ability.

After completing the initial performance tests the batteries were subjected to the DIN Cycle life test. The cycle is composed of a 5-hour charge and a 2-hour discharge. The charge was performed at 40° C.+/−2 ° C., voltage 14.8 v and current of $0.25 \times C_{20}$. The discharge was performed at 40° C.+/−2° C., current $I=0.25 \times C_{20}$. Ten cycles of the charge/discharge described above, lasting 70 hours, are performed followed by 65-hours on open circuit. This describes one DIN cycle and requires one week to complete. Cold crank ability is performed after this cycling regimen. End-of-discharge voltage (U) criteria must be met or exceeded after each $10^{th}$ cycle oe each one-week DIN cycle ($U_{disch\ 10th}$). Certain cold crank ability standards must be met or exceeded after the fifth week of the above cycling regimen. Testing was concluded after 17 weeks of cycling, the data is presented in Table 2.

The advantage of the present invention is demonstrated in the data contained in Table 2. It should be noted that all batteries met or exceeded the minimum 5-week requirements for DIN cycle life test and consequently the expanders are considered suitable for use in commercial batteries. However the value in the present invention as represented by Composition 3 is demonstrated by the observation that storage batteries of the lead-acid type containing Composition 3 cycled considerably longer than batteries containing either of the base organic expanders, Vanisperse A or Curan, at equivalent dosage.

The advantage of the present invention is most dramatically evident when storage batteries of the lead-acid type containing organic expander at the 0.2% concentration are compared.

First, referencing the end-of-discharge voltage data taken at the end of each weekly cycle; the storage battery containing the embodiment of the invention, Composition 3, met or exceeded the minimum requirement for the entire 17-week test period whereas storage batteries containing Vanisperse A or Curan at same dosage lasted for significantly shorter periods, 9 and 5 weeks, respectively.

Second, referencing the battery voltage at the $30^{th}$ second of the CCA discharge, again the storage battery containing the embodiment of the invention, Composition 3, met or exceeded the minimum voltage requirement for the entire 17-week test period whereas storage batteries containing the base organic expanders, Vanisperse A or Curan lasted for considerably shorter periods, 13 weeks and 13 weeks, respectively.

Third, referencing the battery voltage at the 60$^{th}$ second of the CCA discharge, the storage battery containing the embodiment of the invention, Composition 3, met or exceeded the minimum voltage requirement for 16 weeks whereas storage batteries containing the base organic expanders, Vanisperse A or Curan lasted considerably shorter, 10 weeks and 10 weeks, respectively.

Fourth, referencing the cold crank ability discharge time, $t_{CCA}$, the storage battery containing the embodiment of the invention, Composition 3, met or exceeded the minimum voltage requirement for the entire 17-week test period whereas storage batteries containing the base organic expanders, Vanisperse A or Curan lasted for a considerably shorter period, 12 weeks and 11 weeks, respectively.

Fifth, referencing the battery voltage at the 30$^{th}$ second of the CCA discharge, the storage battery containing the embodiment of the invention, Composition 3, met or exceeded the minimum voltage requirement for 16 weeks whereas storage batteries containing the base organic expanders, Vanisperse A or Curan lasted considerably shorter, 13 weeks and 13 weeks, respectively.

Finally, referencing the cold crank ability capacity, $C_{CCA}$, relative to $0.2 \times C_{20}$ capacity, the storage battery containing the embodiment of the invention, Composition 3, met or exceeded the minimum requirement for 16 weeks whereas storage batteries containing the base organic expanders, Vanisperse A or Curan lasted for considerably shorter periods, 11 weeks and 10 weeks, respectively.

In summary, the life of the storage batteries constructed containing an example of the present invention, Composition 3, on DIN cycling is between 15 and 17 weeks, i.e., it is three times longer than the required DIN cycle life span and is considerably longer than that of the storage batteries constructed with either Vanisperse A or Curan, alone.

Another advantage of the present invention aside from improved cycle life capacity and cold crank ability is the present invention lessens the effect of dosage. The data in Table 2 demonstrate that the performance properties of the lead-acid storage batteries are strongly dependant on and vary with the dosage of the base organic expanders, Vanisperse A and Curan, whereas the performance properties of lead-acid storage batteries containing the present invention as represented by Composition 3 are affected only slightly with changes in dosage.

Table 2. Results from DIN 43539-2 Cycle Life Tests of 45 Ah batteries assembled with negatives containing organic expanders at 0.1, 0.2 and 0.4%.

| DIN Requirement minimum @ 5 weeks (5 cycles) Expander Dosage % | $U_{disch\ 10th}$ 10.0 v | $U^{30"}$ 7.2 v | $U^{60"}$ 7.25 v | $t_{CCA}$ 60 sec | $C_{CCA}$ 50% of $0.2 \times C_{20}$ |
|---|---|---|---|---|---|
| | Number of Cycles Completed Passing Requirement | | | | |
| Vanisperse A | | | | | |
| 0.1% | 15 | 14 | 14 | 14 | 14 |
| 0.2% | 9 | 13 | 10 | 12 | 11 |
| Composition 3 | | | | | |
| 0.1% | 17 | 17 | 14 | 16 | 11 |
| 0.2% | 17 | 17 | 16 | 17 | 16 |
| 0.4% | 17 | 17 | 15 | 17 | 17 |
| Curan | | | | | |
| 0.1% | 17 | 17 | 10 | 12 | 10 |
| 0.2% | 5 | 13 | 10 | 11 | 10 |
| 0.4% | 9 | 13 | 11 | 12 | 11 |

Key to table symbols and requirements:
Lower Limit Requirement of the DIN43539-2 test protocol are:

$U_{disch\ 10th} >/= 10.0$ v where $U_{disch\ 10th}$ is the end-of-discharge voltage at the end of the week test cycle.
$U^{30"5week} >/= 7.2$ v where $U^{30"5week}$ is the battery voltage at the 30$^{th}$ second of the CCA discharge after 5 weeks of cycling.
$U^{60"5week} >/= 7.25$ v where $U^{60"5week}$ is the battery voltage at the 60$^{th}$ second of the CCA discharge after 5 week of cycling.
$t_{CCA} = 60$ s where $t_{CCA}$ is the discharge time to 6.0V after 5 weeks of cycling
$C_{CCA} >/= 50\%$ of $0.2 \times C_{20}$ where $C_{CCA}$ is the capacity during CCA test and $C_{20}$ is the 20-hour capacity at 25° C.

EXAMPLE 3

To further illustrate the present invention the following examples are presented. Lead-acid cells composed of two positive plates and one negative plate, an accepted method to screen components critical to the negative plate, were again employed. By design the performance of the cell is limited by the negative plate. The negative plate and cell construction is described below. After initial capacity and cold crank ability tests the cells were set to 300 charge/discharge cycles. After cycling the cells were tested for capacity and cold crank ability. The negative plates were produced using commercial grids cast from Pb—0.08%Ca—0.9%Sn alloy. The pastes were prepared using a laboratory Hobart mixer. The following paste formulation was used: leady oxide with 75% degree of oxidation, 0.1 wt. % carbon black, 0.7 wt. % $BaSO_4$ (blanc fixe) and 0.2 wt % organic expander. $H_2SO_4$ solution (1.4 s.g.) was added to the mixture in a ratio 28 ml $H_2SO_4$/lb. PbO. Water was added in an amount to yield a paste density of 70+/−2 g/in$^3$. The paste was mixed for 20 minutes at a temperature not exceeding 50° C.

The thus prepared paste was pasted onto the grids and the plates were set to curing at 20° C. for 48 hours. Cells were assembled with one negative and two positive plates. The cured plates were then subjected to formation. $H_2SO_4$ with s.g. 1.235 was used. Cells were formed by charging constant current at 1.5 amp to cell voltage of 2.67 volts/cell, then constant voltage 2.67 volts/cell until current did not change by more than 0.1 amps over a three hour period. The quantity of electricity passed through the plates during formation was 1.8 of their theoretical capacity. All plates had equal weight and their rated theoretical capacity was 11.7 Ah.

The capacity was measured at 3.6 amp rate of discharge at 20 to 22° C. The cold crank ability (CCA) was determined on discharge of cells with a current I=25 amp at −18° C.+/−1° C. After measuring initial performance properties cells were set to 300 charge/discharge cycles. Charge was constant current at 1.5 amp to 2.67 volts/cell then constant voltage at 2.67 volts/cell for a maximum time of 24 minutes. Discharge was 3.6 amps for four minutes. Table 3 summarizes the capacity and cold crank ability data, average of two cells, for measurements taken at initial and after 300 cycles for cells comprising one negative and two positive plates Example 3a embodies an organic expander composition where the oxylignin and the kraft lignin are not pre-reacted or premixed where the oxylignin is Vanisperse A and the kraft lignin is Curan. The data indicate cells of the lead-acid type containing the embodiment of the present invention yield capacity and cold crank ability performance significantly improved, after cycling, compared to cells of the lead-acid type containing only organic expanders representing prior art, the oxylignin, Vanisperse A, or the kraft lignin, Curan.

Example 3b embodies an organic expander composition where the oxylignin and the kraft lignin are not pre-reacted or premixed and the oxylignin is Vanisperse A and the kraft lignin is Indulin AT. The data indicate cells of the lead-acid type containing the embodiment of the present invention yield capacity performance significantly improved, after cycling, compared to cells of the lead-acid type containing only organic expanders representing prior art, the oxylignin, Vanisperse A, or the kraft lignin, Indulin AT.

Examples 3a and 3b demonstrate that unmodified kraft lignins (unsulfonated, unoxidized) such as Curan and Indulin AT perform well in the blend, and that condensation with formaldehyde is not required to yield the improved performance of the oxylignin/kraft lignin blend, but is only optional. Formaldehyde functions as a condensing agent to condense the kraft lignin with the oxylignin. It should be noted that during such a condensation reaction, the kraft lignin may condense with another kraft lignin to form a modified kraft lignin, for use in the blend. Likewise, an oxylignin may condense with another oxylignin to form a modified oxylignin for use in the blend. Other possible compounds that may be used as the condensing agent include paraformaldehyde and dialdehydes such as glyoxal and gluteraldehyde.

Table 3. Results from capacity and cold crank ability measurements of 11.7 amp-hour cells (theoretical) assembled with negative plates containing 0.2% organic expander.

| N | Expander In Paste Organic Expander | Blend Ratio | Capacity Average Initial, Amp-hr. | Average After 300 Cycles, Amp-hr. | Cold Crank Ability Average Initial, sec. | After 300 Cycles, sec. |
|---|---|---|---|---|---|---|
|   |   | Example 3a |   |   |   |   |
| 1 | Composition 6  Vanisperse A | 1 | 7.03 | 5.78 | 171 | 191 |
| 2 | Composition 5  Curan/Van A | 2:1 | 7.24 | 6.21 | 176 | 249 |
| 3 | Composition 7  Curan | 1 | 7.16 | 5.83 | 183 | 214 |
|   |   | Example 3b |   |   |   |   |
| 4 | Composition 6  Varnisperse A | 1 | 7.03 | 5.78 | 171 | 191 |
| 5 | Composition 4  Indulin/Van A | 2:1 | 7.17 | 6.24 | 175 | 168 |
| 6 | Composition 8  Indulin AT | 1 | 6.92 | 6.00 | 195 | 240 |

Discussion

The expected performance of an organic expander comprised of a blend is that the blend's performance would be a proportional compromise of the base materials' strengths and weaknesses. Some have better cold crank ability, while others have better reserve capacity. The present work was designed to demonstrate that a blend can level the base materials' performance.

Example 1 shows initial performance tests for three blends of oxylignin and kraft lignin where their performance does not exceed both base materials, i.e. their performance has been leveled. The amount of energy that was extracted from the batteries under reserve capacity or cold crank ability tests did not exceed the energy that at least one of the base lignins could do. Their initial performance, as expected, was a compromise of the two base organic expanders.

What was unexpected and was observed in Example 2, is that in the cycle life tests batteries containing the blend consisting of an oxylignin and kraft lignin lasted far longer than batteries containing either base lignin for all criteria measured. The incorporation of the blend allowed extraction of energy from the battery for substantially longer period of time, i.e. the batteries lasted longer.

The synergistic effect upon cycling and the benefit at lower dosage were unexpected. The mechanism causing these phenomenal results is not known for certain. Possibly the base organic expanders are acted upon in-situ by the chemical and electrical processes that occur in the lead-acid storage battery to yield a more effective compound.

What is claimed is:

1. An organic expander composition for use in a negative plate of a lead-acid storage battery, comprising a blend of an oxylignin and a kraft lignin, said blend containing from about 1 part oxylignin and about 2 parts kraft lignin to about 2 parts oxylignin and about 1 part kraft lignin, wherein said blend further includes water, and wherein said blend has a pH of from about 10 to about 11.2.

2. The composition of claim 1 wherein said kraft lignin comprises a condensation reaction product between kraft lignins, or between kraft lignin and an oxylignin, and a condensation agent.

3. The composition of claim 2 wherein said condensation agent is selected from the group consisting of formaldehyde, paraformaldehyde and dialdehydes.

4. The composition of claim 1 wherein said oxylignin comprises a condensation reaction product between oxylignins, or between an oxylignin and a kraft lignin, and a condensation agent.

5. The composition of claim 4 wherein said condensation agent is selected from the group consisting of formaldehyde, paraformaldehyde and dialdehydes.

6. A paste for use in a negative plate of a lead-acid storage battery, comprising an admixture of:

water;

a lead-containing compound; and an organic expander composed of a blend of a oxylignin and a kraft lignin, said blend containing from about 1 part oxylignin and about 2 parts kraft lignin to about 2 parts oxylignin and about 1 part kraft lignin, and wherein said blend has a pH of from about 10 to about 11.2.

7. The paste of claim 6 wherein said kraft lignin comprises a condensation reaction product between kraft lignins, or between a kraft lignin and an oxylignin, and a condensation agent.

8. The paste of claim 7 wherein said condensation agent is selected from the group consisting of formaldehyde, paraformaldehyde and dialdehydes.

9. The paste of claim 6 wherein said oxylignin comprises a condensation reaction product between oxylignins, or between an oxylignin and a kraft lignin, and a condensation agent.

10. The paste of claim 9 wherein said condensation agent is selected from the group consisting of formaldehyde, paraformaldehyde and dialdehydes.

11. The paste of claim 6 wherein said lead-containing compound comprises leady oxide.

12. The paste of claim 6 wherein said admixture further includes carbon black.

13. The paste of claim 6 wherein said admixture further includes barium sulfate.

14. The paste of claim 6 wherein said admixture further includes sulfuric acid.

15. The paste of claim 6 wherein said blend of oxylignin and kraft lignin comprises from about 0.1% to about 0.4% by weight based on the weight of said lead-containing compound.

16. A negative plate for a lead-acid storage battery, comprising:

a grid; and a paste covering said grid, said paste comprising an admixture of water, a lead-containing compound, and an organic expander composed of a blend of an oxylignin and kraft lignin, said blend containing from about 1 part oxylignin and about 2 parts kraft lignin to about 2 parts oxylignin and about 1 part kraft lignin, and wherein said blend has a pH of about 10 to about 11.2.

17. The plate of claim 16 wherein said lead-containing compound comprises leady oxide.

18. The plate of claim 16 wherein said admixture further includes carbon black.

19. The plate of claim 16 wherein said admixture further includes barium sulfate.

20. The plate of claim 16 wherein said admixture further includes sulfuric acid.

21. The plate of claim 16 wherein said blend of oxylignin and kraft lignin comprises from about 0.1% to about 0.4% by weight based on the weight of said lead-containing compound.

22. The plate of claim 16 wherein said oxylignin comprises a condensation reaction product between oxylignins, or between an oxylignin and a kraft lignin, and a condensation agent.

23. The plate of claim 22 wherein said condensation agent is selected from the group consisting of formaldehyde, paraformaldehyde and dialdehydes.

24. The plate of claim 16 wherein said kraft lignin comprises a condensation reaction product between kraft lignins, or between a kraft lignin and an oxylignin, and a condensation agent.

25. The plate of claim 24 wherein said condensation agent is selected from the group consisting of formaldehyde, paraformaldehyde and dialdehydes.

26. A method of making a negative plate for a lead-acid storage battery, comprising the steps of:

preparing a paste comprising an admixture of water, a lead-containing compound, and an organic expander composed of a blend of an oxylignin and a kraft lignin, said blend containing from about 1 part oxylignin and about 2 parts kraft lignin to about 2 parts oxylignin and about 1 part kraft lignin, and wherein said blend has a pH of between about 10 to about 11.2;

covering a grid with said paste; and curing said paste on said grid.

27. The method of claim 26 wherein said lead-containing compound comprises leady oxide.

28. The method of claim 26 wherein said admixture further includes carbon black.

29. The method of claim 26 wherein said admixture further includes barium sulfate.

30. The method of claim 26 wherein said admixture further includes sulfuric acid.

31. The method of claim 26 wherein said blend of oxylignin and kraft lignin comprises from about 0.1% to about 0.4% by weight based on the weight of said lead-containing compound.

32. The method of claim 26 wherein said oxylignin comprises a condensation reaction product between oxylignins, or between an oxylignin and a kraft lignin, and a condensation agent.

33. The method of claim 32 wherein said condensation agent is selected from the group consisting of formaldehyde, paraformaldehyde and dialdehydes.

34. The method of claim 26 wherein said kraft lignin comprises a condensation reaction product between kraft lignins, or between a kraft lignin and an oxylignin, and a condensation agent.

35. The method of claim 34 wherein said condensation agent is selected from the group consisting of formaldehyde, paraformaldehyde and dialdehydes.

* * * * *